US012779660B2

(12) United States Patent
You

(10) Patent No.: US 12,779,660 B2
(45) Date of Patent: Nov. 3, 2026

(54) LOCK CATCH MECHANISM FOR A CASE, A CASE AND A COMBINED CONTAINER THEREOF

(71) Applicant: Ningbo Meiqi Tool Co., Ltd., Zhejiang (CN)

(72) Inventor: Lizhong You, Ningbo (CN)

(73) Assignee: Ningbo Meiqi Tool Co., Ltd., Ninghai County (CN)

( * ) Notice: Subject to any disclaimer, the term of this patent is extended or adjusted under 35 U.S.C. 154(b) by 6 days.

(21) Appl. No.: 18/848,211

(22) PCT Filed: Apr. 21, 2022

(86) PCT No.: PCT/CN2022/088040
§ 371 (c)(1),
(2) Date: Sep. 18, 2024

(87) PCT Pub. No.: WO2023/193306
PCT Pub. Date: Oct. 12, 2023

(65) Prior Publication Data

US 2025/0205871 A1 Jun. 26, 2025

(30) Foreign Application Priority Data

Apr. 8, 2022 (CN) ........................ 202210370114.X

(51) Int. Cl.
*B25H 3/02* (2006.01)
*A45C 5/04* (2006.01)
(Continued)

(52) U.S. Cl.
CPC ................. *B25H 3/02* (2013.01); *A45C 5/04* (2013.01); *B65D 21/0223* (2013.01)

(58) Field of Classification Search
CPC ... A45C 13/00; A45C 13/1084; A45C 13/385; A45C 5/04; A45C 5/14; A45C 7/0045;
(Continued)

(56) References Cited

U.S. PATENT DOCUMENTS

| | | | | |
|---|---|---|---|---|
| 2018/0161975 A1* | 6/2018 | Brunner | .................. | A45C 5/14 |
| 2020/0298392 A1* | 9/2020 | Baruch | .................... | B25H 3/02 |
| 2021/0031975 A1* | 2/2021 | Brunner | .................. | B25H 3/02 |

FOREIGN PATENT DOCUMENTS

| | | | | |
|---|---|---|---|---|
| CN | 108516209 A * | 9/2018 | ............. | B65D 55/02 |
| CN | 111924270 A * | 11/2020 | ............. | F16B 5/123 |

(Continued)

*Primary Examiner* — Anthony D Stashick
*Assistant Examiner* — Marcos Javier Rodriguez Molina
(74) *Attorney, Agent, or Firm* — Wang Law Firm, Inc.

(57) ABSTRACT

A lock catch mechanism for a case comprises a lock catch member being rotatably connected to a sidewall of the case body or the lid; one or more elastic members disposed on the sidewall of the case body or the lid. The lock catch member is capable of rotating relative to the case around a horizontally extending rotating shaft, and is capable of moving upward and downward along the sidewall of the case body or the lid. The lock catch member moves upward or downward against an elastic restoring force of the one or more elastic members when acted upon by an external force and resets to a rest position when the external force withdraws. The present invention also discloses a case and a combined container. Abrasion and deformation to the case is reduced and failure of locking due to the deformation of the material of the case is avoid.

13 Claims, 11 Drawing Sheets

(51) Int. Cl.

| | |
|---|---|
| ***B65D 21/02*** | (2006.01) |
| *A45C 5/14* | (2006.01) |
| *A45C 7/00* | (2006.01) |
| *A45C 13/00* | (2006.01) |
| *A45C 13/10* | (2006.01) |
| *A45C 13/38* | (2006.01) |

(58) Field of Classification Search

CPC . B25H 1/04; B25H 3/006; B25H 3/02; B25H 3/023; B25H 3/021; B25H 3/022; B65D 1/0207; B65D 11/1833; B65D 11/184; B65D 11/1866; B65D 11/20; B65D 11/22; B65D 19/06; B65D 19/10; B65D 19/12; B65D 19/18; B65D 19/38; B65D 19/385; B65D 19/44; B65D 21/02; B65D 21/0204; B65D 21/0209; B65D 21/0212; B65D 21/0213; B65D 21/0217; B65D 21/0222; B65D 21/0223; B65D 21/0228; B65D 21/023; B65D 21/064; B65D 21/086; B65D 2203/00; B65D 2203/06; B65D 2203/10; B65D 2211/00; B65D 2215/02; B65D 2215/06; B65D 2251/1058; B65D 2255/00; B65D 25/005; B65D 25/02; B65D 25/08; B65D 25/10; B65D 25/205; B65D 25/24; B65D 25/28; B65D 25/48; B65D 2519/00024; B65D 2519/00034; B65D 2519/00059; B65D 2519/00069; B65D 2519/00164; B65D 2519/00174; B65D 2519/00233; B65D 2519/00268; B65D 2519/00273; B65D 2519/00288; B65D 2519/00293; B65D 2519/00298; B65D 2519/00308; B65D 2519/00318; B65D 2519/00323; B65D 2519/00333; B65D 2519/00338; B65D 2519/00407; B65D 2519/00497; B65D 2519/00502; B65D 2519/00512; B65D 2519/00532; B65D 2519/00562; B65D 2519/00572; B65D 2519/00611; B65D 2519/00646; B65D 2519/00656; B65D 2519/00711; B65D 2519/00781; B65D 2519/00805; B65D 2519/00815; B65D 2519/009; B65D 2519/0096; B65D 2543/00194; B65D 2543/00296; B65D 2543/00537; B65D 2543/00555; B65D 2543/00685; B65D 2543/0074; B65D 2583/0481; B65D 39/0076; B65D 41/005; B65D 41/50; B65D 43/02; B65D 43/0212; B65D 43/16; B65D 43/162; B65D 43/163; B65D 43/164; B65D 43/20; B65D 43/22; B65D 43/26; B65D 45/02; B65D 45/16; B65D 47/06; B65D 47/0828; B65D 47/36; B65D 50/00; B65D 50/04; B65D 50/045; B65D 50/046; B65D 51/002; B65D 51/224; B65D 51/24; B65D 51/2807; B65D 51/2821; B65D 51/2835; B65D 53/02; B65D 55/02; B65D 55/14; B65D 7/26; B65D 81/05; B65D 81/18; B65D 81/266; B65D 81/32; B65D 81/3211; B65D 81/3222; B65D 81/325; B65D 81/3261; B65D 83/00; B65D 83/0409; B65D 83/0418; B65D 83/0463; B65D 83/08; B65D 83/766; B65D 85/00; B65D 85/34; B65D 85/68; B65D 85/70; B65D 85/804; B65D 85/8058; B65D 85/8067; B65D 88/12; B65D 88/121; B65D 88/129; B65D 88/14; B65D 88/522; B65D 88/524; B65D 88/56; B65D 9/14; B65D 90/0013; B65D 90/0026; B65D 90/006; B65D 90/008; B65D 90/08; B65D 90/10; B65D 90/623; B65D 1/02; B65D 1/0215; B65D 1/023; B65D 1/12; B65D 1/14; B65D 1/165; B65D 1/22; B65D 1/225; B65D 1/243; B65D 1/265; B65D 1/34; B65D 1/36; B65D 1/40; B65D 1/42; B65D 1/46; B65D 11/06; B65D 11/10; B65D 11/18; B65D 11/1806; B65D 11/186; B65D 11/1873; B65D 11/26; B65D 17/28; B65D 17/30; B65D 17/401; B65D 17/4014; B65D 19/0026; B65D 19/0095; B65D 19/08; B65D 19/42; B65D 21/00; B65D 21/0201; B65D 21/0202; B65D 21/0215; B65D 21/0216; B65D 21/0219; B65D 21/0224; B65D 21/0226; B65D 21/0233; B65D 21/0235; B65D 21/0237; B65D 21/045; B65D 21/062; B65D 21/08; B65D 21/083; B65D 2203/02; B65D 2203/12; B65D 2215/00; B65D 2215/04; B65D 2231/027; B65D 2251/0025; B65D 2251/0093; B65D 2251/10; B65D 2251/1066; B65D 2251/20; B65D 2255/20; B65D 23/12; B65D 2313/00; B65D 2401/00; B65D 25/00; B65D 25/04; B65D 25/06; B65D 25/101; B65D 25/107; B65D 25/108; B65D 25/18; B65D 25/20; B65D 25/22; B65D 25/2808; B65D 25/282; B65D 25/2826; B65D 25/2841; B65D 25/2852; B65D 25/2858; B65D 25/2885; B65D 25/2888; B65D 25/30; B65D 25/32; B65D 25/34; B65D 25/38; B65D 25/56; B65D 2501/24019; B65D 2501/2407; B65D 2501/24076; B65D 2501/24114; B65D 2501/24127; B65D 2501/24133; B65D 2501/24152; B65D 2501/24184; B65D 2501/24216; B65D 2501/24254; B65D 2501/24267; B65D 2501/24286; B65D 2501/24299; B65D 2501/24324; B65D 2501/2435; B65D 2501/24541; B65D 2501/24598; B65D 2501/24777; B65D 2501/24783; B65D 2501/24802; B65D 2501/2484; B65D 2501/24847; B65D 2501/24853; B65D 2501/24878; B65D 2501/24961; B65D 2517/0014; B65D 2517/0034; B65D 2517/0062; B65D 2519/00029; B65D 2519/00044; B65D 2519/00064; B65D 2519/00094; B65D 2519/00099; B65D 2519/00104; B65D 2519/00129; B65D 2519/00169; B65D 2519/00184; B65D 2519/00199; B65D 2519/00203; B65D 2519/00208; B65D 2519/00348; B65D 2519/00373; B65D 2519/00412; B65D 2519/00422; B65D 2519/00432; B65D 2519/00437; B65D 2519/00527; B65D 2519/00557; B65D 2519/00567; B65D 2519/00587; B65D 2519/00621; B65D 2519/00626; B65D 2519/00631; B65D 2519/00641; B65D 2519/00661; B65D 2519/00666; B65D 2519/00676; B65D 2519/00691;

B65D 2519/00721; B65D 2519/00771; B65D 2519/00786; B65D 2519/00791; B65D 2519/00796; B65D 2519/008; B65D 2519/0081; B65D 2519/0082; B65D 2519/0086; B65D 2519/00875; B65D 2519/00905; B65D 2519/0094; B65D 2519/0097; B65D 2519/00975; B65D 2519/0099; B65D 2525/283; B65D 2525/285; B65D 2525/287; B65D 2543/00027; B65D 2543/00046; B65D 2543/00092; B65D 2543/00175; B65D 2543/00268; B65D 2543/00277; B65D 2543/00351; B65D 2543/00407; B65D 2543/00435; B65D 2543/00481; B65D 2543/0049; B65D 2543/00509; B65D 2543/00518; B65D 2543/00527; B65D 2543/00546; B65D 2543/00564; B65D 2543/00574; B65D 2543/00629; B65D 2543/00694; B65D 2543/00731; B65D 2543/00796; B65D 2543/00805; B65D 2543/00842; B65D 2543/00953; B65D 2543/00972; B65D 2543/0099; B65D 2583/0409; B65D 2583/0468; B65D 2585/6817; B65D 2585/6867; B65D 2585/6882; B65D 2590/0016; B65D 2590/0033; B65D 2590/0058; B65D 2590/666; B65D 31/16; B65D 33/004; B65D 33/16; B65D 33/1616; B65D 33/1658; B65D 33/1675; B65D 33/25; B65D 33/30; B65D 35/30; B65D 39/00; B65D 39/0005; B65D 39/0052; B65D 39/12; B65D 39/16; B65D 41/0471; B65D 41/0478; B65D 41/06; B65D 41/62; B65D 43/0202; B65D 43/0204; B65D 43/0208; B65D 43/021; B65D 43/0216; B65D 43/0218; B65D 43/0222; B65D 43/0225; B65D 43/0231; B65D 43/065; B65D 43/14; B65D 43/161; B65D 43/165; B65D 43/168; B65D 43/169; B65D 43/24; B65D 45/025; B65D 45/18; B65D 45/20; B65D 45/24; B65D 47/00; B65D 47/08; B65D 47/0804; B65D 47/0842; B65D 47/12; B65D 47/20; B65D 47/2012; B65D 47/2018; B65D 47/2025; B65D 47/2031; B65D 47/2037; B65D 47/2068; B65D 47/248; B65D 47/265; B65D 47/32; B65D 47/44; B65D 5/38; B65D 50/041; B65D 50/048; B65D 50/06; B65D 51/18; B65D 51/20; B65D 51/241; B65D 51/242; B65D 51/246; B65D 51/247; B65D 51/28; B65D 53/00; B65D 53/06; B65D 55/00; B65D 55/06; B65D 55/10; B65D 55/12; B65D 59/04; B65D 63/1063; B65D 65/02; B65D 65/38; B65D 65/40; B65D 65/466; B65D 7/00; B65D 7/045; B65D 7/24; B65D 71/50; B65D 71/70; B65D 75/008; B65D 75/28; B65D 75/327; B65D 75/40; E05B 65/50; E05B 65/52; E05C 19/14; Y10T 292/0917; B61G 3/24

USPC ........ 206/6, 7, 81, 82, 83, 84, 1.5, 1.7, 102, 206/134, 143, 144, 145, 146, 150, 151, 206/162, 19, 194, 196, 203, 204, 205, 206/210, 215, 216, 217, 218, 219, 221, 206/223, 225, 228, 229, 232, 233, 235, 206/236, 256, 259, 263, 265, 266, 270, 206/271, 278, 289, 292, 298, 3, 303, 304, 206/305, 307, 307.1, 308.1, 308.2, 308.3, 206/309, 310, 311, 312, 313, 314, 315.1, 206/315.11, 315.2, 315.3, 315.4, 315.5, 206/315.6, 315.7, 315.9, 315.91, 316.2, 206/317, 318, 319, 320, 321, 322, 325, 206/335, 336, 338, 339, 340, 344, 349, 206/350, 354, 356, 358, 361, 362, 363, 206/364, 365, 366, 369, 37, 37.1, 370, 206/371, 372, 373, 374, 375, 376, 377, 206/378, 379, 38, 380, 386, 387.1, 206/387.11, 387.12, 387.13, 387.15, 388, 206/389, 39, 39.3, 39.4, 390, 391, 394, 206/395, 398, 400, 403, 405, 407, 408, 206/409, 419, 420, 423, 425, 427, 428, 206/429, 432, 433, 434, 438, 439, 440, 206/442, 443, 445, 446, 448, 449, 45.2, 206/45.23, 45.24, 45.28, 45.29, 45.3, 451, 206/453, 454, 455, 456, 457, 459.1, 206/459.5, 460, 461, 462, 467, 470, 471, 206/472, 477, 480, 484.2, 485, 486, 493, 206/494, 495, 497, 499, 5, 5.1, 500, 501, 206/503, 504, 505, 506, 507, 508, 509, 206/510, 511, 512, 513, 514, 515, 517, 206/518, 519, 520, 521, 521.1, 521.8, 206/522, 523, 524.5, 524.6, 524.8, 525, 206/526, 528, 53, 531, 532, 533, 534, 206/534.1, 535, 538, 539, 540, 541, 542, 206/544, 545, 549, 554, 555, 557, 558, 206/559, 560, 561, 562, 563, 564, 565, 206/566, 569, 570, 571, 573, 575, 576, 206/577, 579, 581, 583, 585, 586, 587, 206/589, 591, 592, 594, 595, 596, 597, 206/598, 599, 6.1, 600, 63.3, 63.5, 69, 206/701, 703, 704, 706, 707, 709, 710, 206/711, 713, 718, 719, 722, 723, 724, 206/725, 728, 736, 738, 743, 745, 746, 206/752, 755, 756, 763, 764, 765, 769, 206/77.1, 771, 772, 773, 774, 775, 776, 206/781, 782, 8, 800, 803, 804, 806, 807, 206/811, 813, 815, 817, 818, 820, 821, 206/823, 828, 83.5, 832, 833, 88; 292/163; 70/1.5, 100, 101, 106, 107, 70/108, 109, 110, 118, 120, 129, 131, 70/133, 134, 135, 137, 139, 14, 141, 142, 70/143, 144, 145, 149, 15, 150, 151 R, 70/152, 153, 154, 156, 157, 158, 159, 16, 70/162, 164, 167, 168, 169, 17, 18, 180, 70/181, 185, 186, 19, 195, 196, 201, 202, 70/203, 206, 207, 208, 209, 21, 210, 211, 70/212, 213, 214, 215, 216, 218, 219, 70/221, 222, 223, 224, 226, 227, 228, 70/232, 233, 237, 240, 241, 247, 248, 25, 70/252, 254, 255, 256, 257, 258, 259, 70/262, 263, 264, 267, 269, 271, 272, 70/273, 275, 276, 277, 278.1, 278.2, 70/278.3, 278.7, 279.1, 28, 280, 282, 283, 70/284, 285, 288, 289, 29, 298, 299, 30, 70/303 A, 303 R, 304, 306, 310, 312, 70/313, 314, 315, 316, 322, 324, 330, 70/333 R, 337, 339, 34, 340, 341, 344, 70/352, 355, 357, 358, 360, 361, 366, 70/367, 368, 369, 370, 371, 375, 377,

70/378, 379 R, 380, 385, 386, 387, 388, 70/389, 38 A, 38 B, 39, 392, 393, 394, 70/395, 399, 401, 404, 405, 407, 408, 70/409, 411, 413, 416, 417, 418, 419, 70/421, 422, 423, 427, 429, 430, 431, 70/432, 440, 441, 447, 448, 449, 450, 70/451, 452, 453, 455, 456 R, 459, 461, 70/462, 463, 464, 465, 466, 467, 469, 70/470, 472, 474, 475, 476, 477, 478, 70/479, 480, 483, 484, 485, 486, 488, 70/489, 49, 490, 491, 492, 493, 52, 53, 70/56, 57, 57.1, 58, 59, 63, 66, 68, 69, 70/70, 71, 74, 75, 76, 77, 78, 81, 84, 85, 70/88, 89, 90, 91, 92, 93, 95, 97, 99, 70/DIG. 11, DIG. 3, DIG. 30, DIG. 31, 70/DIG. 32, DIG. 41, DIG. 42, DIG. 49, 70/DIG. 54, DIG. 59, DIG. 6, DIG. 67, 70/DIG. 71, DIG. 73, DIG. 80

See application file for complete search history.

(56) References Cited

FOREIGN PATENT DOCUMENTS

| | | | | | |
|---|---|---|---|---|---|
| DE | 202015106824 | U1 | * | 3/2017 | ............... B25H 3/02 |
| DE | 102016112854 | A1 | * | 1/2018 | ............... B25H 3/02 |
| WO | WO-2016142935 | A1 | * | 9/2016 | ......... B65D 21/0224 |
| WO | WO-2021240503 | A1 | * | 12/2021 | ........... B65D 21/023 |

* cited by examiner

LOCK CATCH MECHANISM FOR A CASE, A CASE AND A COMBINED CONTAINER THEREOF

TECHNICAL FIELD OF THE INVENTION

The present invention relates to a field of cases for storage, and particularly relates to a lock catch mechanism for a case, and a case and a combined container thereof.

BACKGROUND OF THE INVENTION

A container for storage, for example a case, usually comprises a case body and a lid covering the case body. The lid and the case body are usually locked by a lock catch mechanism so that the lid cannot be opened easily. For a combined container, in the prior art, two stacked cases are also locked by a lock catch mechanism so as to conveniently transport the multiple cases together and then reliably store them together.

For example, a Chinese patent application CN104118637A (application No.: CN201410171079.4) disclosed a case. The case has a case body and a lid. The lid is mounted onto the case body through two or more lock catch mechanisms that can serve as articulated elements. When the lid is in a closed position, the case body and the lid define an internal compartment. At least two lock catch mechanisms can be disposed to lock the lid to the case body in a releasable way. Furthermore, at least one lock catch comprises an articulated retainer. The articulated retainer allows a pivotal rotation of the lid while the lid is being locked to the case body through the lock catch mechanisms. The case body comprises a lock catch receiving portion used for receiving the articulated retainer.

For another example, a Chinese patent application CN107428436A (application No.: CN201680018142.8) disclosed a combined container, comprising at least one first case and at least one second case. The at least one first case and the least one second case can be detachably connected to each other through a lock catch mechanism. The lock catch mechanism acts between the at least one first case and the least one second case. The at least one first case has, on its top, a latch member being capable of rotating pivotally, and the at least one second case has, on its bottom, a holding portion. The latch member is capable of pivotally rotating between a locked position and an unlocked position. In the locked position, the latch member is engaged to the holding portion; and in the unlocked position, the latch member pivotally displaces to be separated from the holding portion. The holding portion is a hook member protruded outward from a surface of the second case. The hook member is constructed and shaped to, when the latch member is locked thereon, hold and/or catch the latch member and prevent the latch member to move.

However, in this patent, some shortcomings for both the lock catch mechanism used between the lid and the case body in a same case and the lock catch mechanism used for two stacked cases are existed. Specifically, since the latch member is a pivotal member that rotates relative to the case and a certain pre-tightening force is existed during an engagement between the latch member and holding member. When locking or unlocking, the latch member is pushed or pulled hard in a direction vertical to a sidewall of the lid or case body so as to overcome the friction between the latch member and the holding member. It is difficult to apply force during an actual operation, and long-term use may cause abrasion and deformation of the connection position between the latch member and the case and of the holding member of the case, and further cause failure of the lock catch mechanism, resulting in greatly shortened service life of the product. In fact, in order to reduce the deformation of the case as much as possible, materials that are more expensive are usually used. This absolutely increases the material cost of the case.

SUMMARY OF THE INVENTION

It is a first object of the present invention to provide a lock catch mechanism for a case, with a more appropriate angle for an external force to be acted upon a lock catch member during a locking and unlocking process so as to cause less abrasion and deformation to the case.

It is a second object of the present invention to provide a case using the lock catch mechanism. With the lock catch mechanism applied between the lid and the case body of the case, the friction to be overcome during the locking and unlocking process of the case can be effectively reduced so as to avoid the abrasion and deformation of the case. Furthermore, the locking and unlocking operation is smoother and user experience is improved, and the service life of the case is increased.

It is a third object of the present invention to provide a combined container with several cases stacked up and down using the lock catch mechanism. Two adjacent stacked cases are locked or unlocked by the lock catch mechanism.

For achieving the first object, the lock catch mechanism for a case, the case comprising a case body having an opening on a top of the case body and a lid covering the opening of the case body, comprises a lock catch member being rotatably connected to a sidewall of the case body or the lid; one or more elastic members disposed on the sidewall of the case body or the lid;

- wherein the lock catch member is capable of rotating relative to the case around a horizontally extending rotating shaft, and is capable of moving upward and downward along the sidewall of the case body or the lid; and
- the lock catch member moves upward or downward against an elastic restoring force of the one or more elastic members when acted upon by an external force and resets to a rest position when the external force withdraws.

To enable the lock catch member to rotatably connect the case, preferably, the lock catch member has a pivot shaft pivoted to the sidewall of the case body or the lid, and the one or more elastic members act on the pivot shaft of the lock catch member.

To avoid an interference between a rotation and a vertical movement of the lock catch member in order to ensure a flexible locking and unlocking of the lock catch member, preferably, the case body or the lid has one or more bumps protruding outward from the sidewall of the case body or the lid, each bump is defined as a connecting seat for being connected to the pivot shaft of the lock catch member; each connecting seat has a vertically extending limiting groove, and a slider slidable along the corresponding limiting groove is constrained in each limiting groove; each connecting seat has an opening laterally communicating with the corresponding limiting groove for the pivot shaft of the lock catch member to pass through to connect to the slider, each elastic member is positioned inside the corresponding limiting groove and resists against the corresponding slider.

With the design of the slider, the lock catch member moves upward and downward more stable and reliable. It may be understood that, in another alternative embodiment, the slider may be omitted. That is, the pivot shaft of the lock catch member directly resists against the one or more elastic members.

To conveniently assemble the lock catch member and the slider and ensure that the lock catch member is capable of freely rotating relative to the slider, preferably, each slider has a positioning hole for receiving the pivot shaft of the lock catch member and the pivot shaft is capable of rotating inside the corresponding positioning hole.

To conveniently assemble the pivot shaft of the lock catch member, the one or more elastic members and the slider into the limiting groove from outside, and to conveniently replace those parts in the future, preferably, the limiting groove is an opening facing outside at a surface of the bump, and a cover plate detachably covers the opening.

The elastic member may be various members in the prior art, for example, elastic elements such as compression springs, torsion springs and reeds. However, to match the slider better so that the slider is capable of being slidable along the limiting groove, as a preferable implementation, preferably, the slider has a positioning post protruding from a top or a bottom of the slider, each elastic member is a compression spring having two ends, one end of each elastic member is sleeved on the positioning post and the other end resists against an inner top wall or inner bottom wall of the limiting groove. With an arrangement of the positioning post on the slider, the assembly of the compression spring is more reliable without shaking or getting stuck.

As another preferable implementation, preferably, the slider has a positioning slot on a top or bottom of the slider, each elastic member is defined as a spring leaf which is capable of being inserted into the positioning slot to resist against an inner top wall or inner bottom wall of the limiting groove. Due to the positioning slot formed on the slider, the assembly of the spring leaf is reliable without falling-off.

The spring leaf may be a spring leaf of various shapes in the prior art, for example, V-shaped, U-shaped or M-shaped structure. In order to match the slider and the limiting groove better in structure, preferably, each spring leaf is an arched strip with an arch-up portion in a middle of the strip; the limiting groove has a limiting recess on the inner top wall or inner bottom wall of the limiting groove at a position corresponding to the arch-up portion of each spring leaf for receiving the arch-up portion; two ends of each spring leaf are limited in the positioning slot of the slider, and the arch-up portion is limited in the limiting recess of the limiting groove.

Generally, the lock catch member may be various members in the prior art, for example, a strip-like pole structure, a U-shaped grip structure, etc. In a preferable embodiment, to simplify the structure of the lock catch member and save the production cost, preferably, the lock catch member is U-shaped as a whole and has two free ends facing each other, the two free ends of the lock catch member extend toward each other or away from each other to form pin portions which are located in a same line, the two pin portions of the lock catch member are rotatably connected to the sidewall of the case body or the lid, the number of the elastic members is two, each of which acts on the corresponding pin portion of the lock catch member.

To conveniently transport or move the case (container), preferably, the lock catch member is used as a handle for holding.

For achieving the second object, a case using the lock catch mechanism comprises the case body having the opening on the top and the lid covering the top opening of the case body; wherein, of the case body and the lid has the lock catch member, and the other one of the case body and the lid has one or more first engagement portions protruding outward from the sidewall of the case body or the lid; vertical positions of the one or more first engagement portions correspond to the lock catch member to engage the lock catch member with the first engagement portions so as to fasten the case body and the lid together.

For achieving the third object, a combined container using the lock catch mechanism comprises at least two stacked cases which are defined as an upper case and a lower case; wherein, the upper case has one or more second engagement portions protruding outward from the sidewall of the case body at a bottom of the sidewall of the case body of the upper case, and the lower case has the lock catch member at the sidewall of the lid or at a top of the sidewall of the case body of the lower case; the lock catch member is capable of at least rotating between a first unlocked position where the lock catch member is disengaged from the corresponding second engagement portion and a second locked position where the lock catch member is engaged with the second engagement portion; the vertical position of the lock catch member of the lower case corresponds to the corresponding second engagement portion of the upper case to engage the lock catch member with the corresponding second engagement portion of the upper case when rotating upward to the second locked position, so that the two cases are fastened together.

For the combined container comprising at least two stacked cases, when the user wants to put into or take out objects from the lower case, generally, the user needs to take down the upper case stacked thereon to open the lid of the lower case, which is absolutely inconvenient. Preferably, the lock catch member is connected to the sidewall of the lid of the lower case so that the lid of the lower case can be opened relative to the case body of the lower case when the lock catch member is in the second locked position. By arranging the lock catch member on the lid of the case, the lid of the lower case in the locked position can still be opened. When the cases are stacked together, the user can still freely put into or take out objects from the lower case, with no need to unlock and take down the upper case.

To avoid damage to the lock member by collision, preferably, the lower case has a resting recess formed on the sidewall of the lid of the lower case for receiving the lock catch member; when the lock catch member moves to the first unlocked position, at least a part of the lock catch member is embedded in the resting recess. Since the lock catch member can be embedded in the groove in the first unlocked position, the damage to the lock catch member by collision in a natural placement position can be avoided well.

Generally, the lock catch member may be a strip-like pole structure, a U-shaped grip structure, etc. The groove may be a concave region which is matched, as a whole, with the strip-like pole structure or a U-shaped grip structure so that the lock catch member can be embedded in the groove as a whole.

In order to avoid damage to the lock catch member by collision and also make the user convenient to take the lock catch member out from the groove, preferably, the lock catch member is U-shaped, and comprises two opposite vertical bar portions each having a free end and a cross bar portion having two ends, each end of the cross bar portion is connected to the free end of one of the two vertical bar portions; the free end of each vertical bar portion of the lock catch member is bent to form a pin portion, and the two pin portions extending toward each other or away from each other are located in the same axis, the lock catch member is rotatably connected to the sidewall of the lid of the case through the two pin portions; the lid has a convex skirt-like edge protruding from a periphery of the sidewall of the lid at a position below the pin portions, the resting recess is formed on a surface of the edge; when the lock catch member moves to the first unlocked position, the cross bar portion of the lock catch member is embedded in the resting recess and is approximately flush to the peripheral surface of the edge.

Since the cross bar portion of the lock catch member is embedded in the groove formed on the edge protruding from the periphery of the sidewall of the lid of the case when the lock catch member is in the first unlocked position, it is hard for the lock catch member to be damaged by collision. On the other hand, since the cross bar portion of the lock catch member resists against the edge, the two pin portions of the lock catch member and the cross bar portion of the lock catch member are dislocated in a vertical direction, that is, the lock catch member inclines away from the case from top to bottom when the lock catch member is in the first unlocked position. This is more convenient for the user to pick the cross bar portion of the lock catch member from the groove on the lid.

Compared with the prior art, the present invention has the following advantages: since the lock catch member is capable of moving upward and downward along the sidewall of the case body or lid of the case against the elastic restoring force of the one or more elastic members during its rotation, so that the lock catch member can be locked and unlocked by applying certain external force to the lock catch member in the up and down direction during the rotation. In such a way, it is unnecessary for the user to laterally apply great force, which meets the operating habit of the user, and effectively reduces the abrasion to the case by the lock catch member due to the friction. It avoids the failure of locking due to the deformation of the material of the case. Accordingly, the case is not required to have enough strength at the corresponding parts. It is thus possible to further reduce the material cost of the case.

On the other hand, under the elastic restoring force of the one or more elastic members, the lock catch member can be reliably engaged with the corresponding engagement portion of the case, so that the locking between two stacked cases (or between the case body and the lid in one case) is more stable and reliable.

The case and the combined container in the present invention also have the above advantages.

DETAILED DESCRIPTION OF THE INVENTION

The present invention will be further described below in detail by embodiments with reference to the accompanying drawings.

It should be noted that in the description and claims of the present invention, the terms used to indicate direction, such as "front, back", "up, down", "left, right", "side, top, bottom", etc. are used to describe structures and elements of the present invention for better explanation. And these terms used here are based on an orientation in the accompanying drawings. Since the embodiments disclosed by the present invention can be set in different directions, these terms indicating directions are only used as explanations and should not be used as restrictions. For example, the verbs "up", "down" should not be limited to the direction opposite or consistent with the gravity.

FIGS. 1-7 show a preferred embodiment of a combined container of the present invention. The combined container comprises at least two stacked cases 10*a*, 10*b* and a lock catch mechanism 20 disposed on the cases. The adjacent two stacked cases 10*a*, 10*b* can be locked together through the lock catch mechanism 20, so that multiple cases can be connected together. It is convenient to transport and store the multiple cases forming the combined container as a whole.

Figure 7:
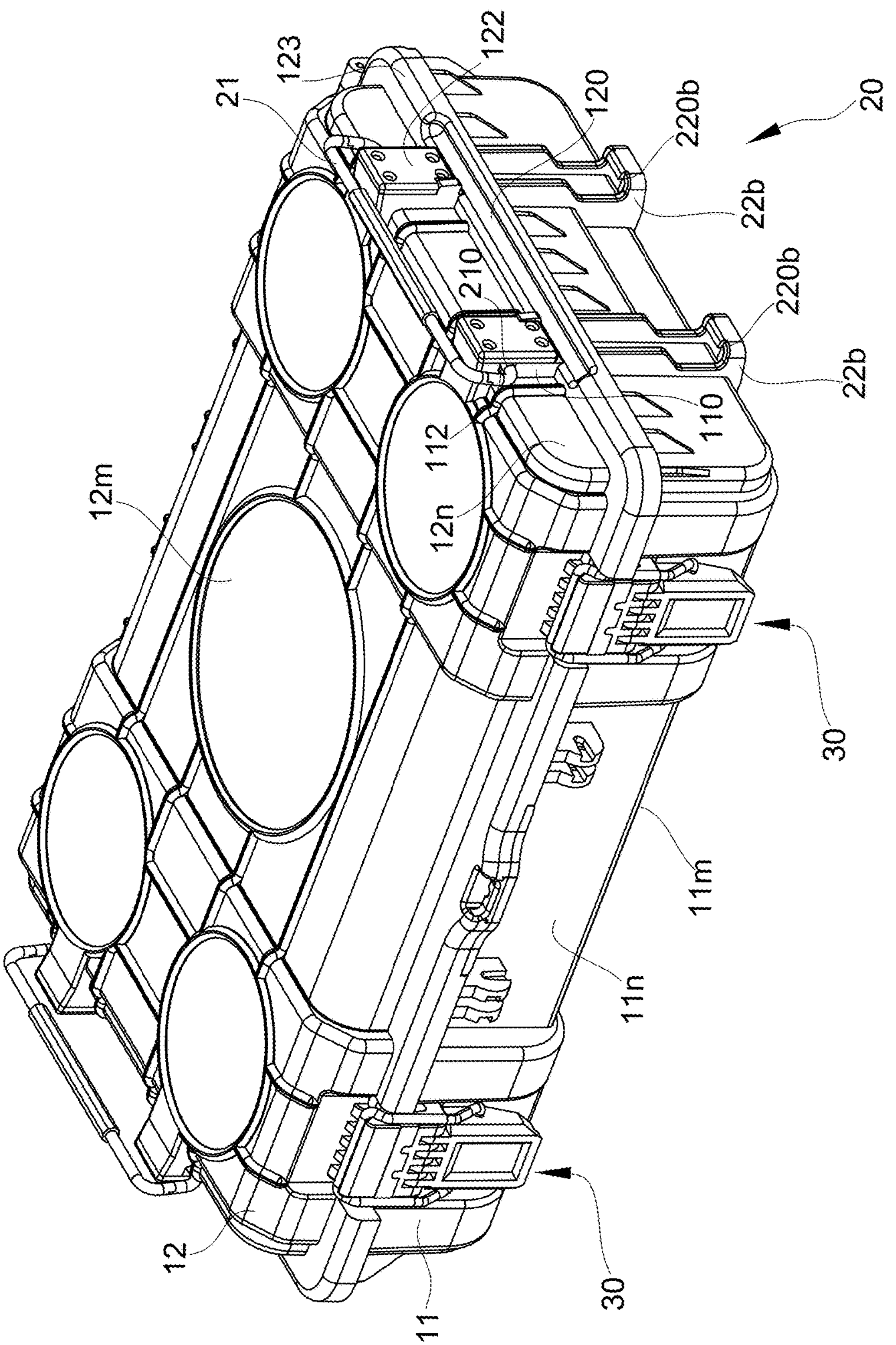
FIG. 7 is a perspective view of a case of the combined container according to the embodiment of the present invention.

FIG. 7 shows a first embodiment of a case of the present invention. Each of the cases 10*a*, 10*b* comprises a case body 11 having an opening on a top of the case body 11 and a lid 12 covering the opening of the case body 11. The case body 11 of each case 10*a*, 10*b* has a bottom wall 11*m* and a sidewall 11*n* extending upward from an edge of the bottom wall 11*m*. The sidewall 11*n* and the bottom wall 11*m* of the case body 11 together define a space for holding objects. The lid 12 has a top wall 12*m* and a sidewall 12*n* extending downward from an edge of the top wall 12*m*. When the lid 12 covers the opening on the top of the case body 11, a bottom of the sidewall 12*n* of the lid 12 resists against on a top of the sidewall 11*n* of the case body 11. In a preferable embodiment, the lid 12 of each case 10*a*, 10*b* has a skirt-like flange 123 protruding from the bottom of the sidewall 12*n* of the lid 12 outward. When the lid 12 covers on the case body 11, the edge 123 of the lid 12 wraps the opening and the periphery of the top of the sidewall 11*n* of the case body 11.

Figure 3:
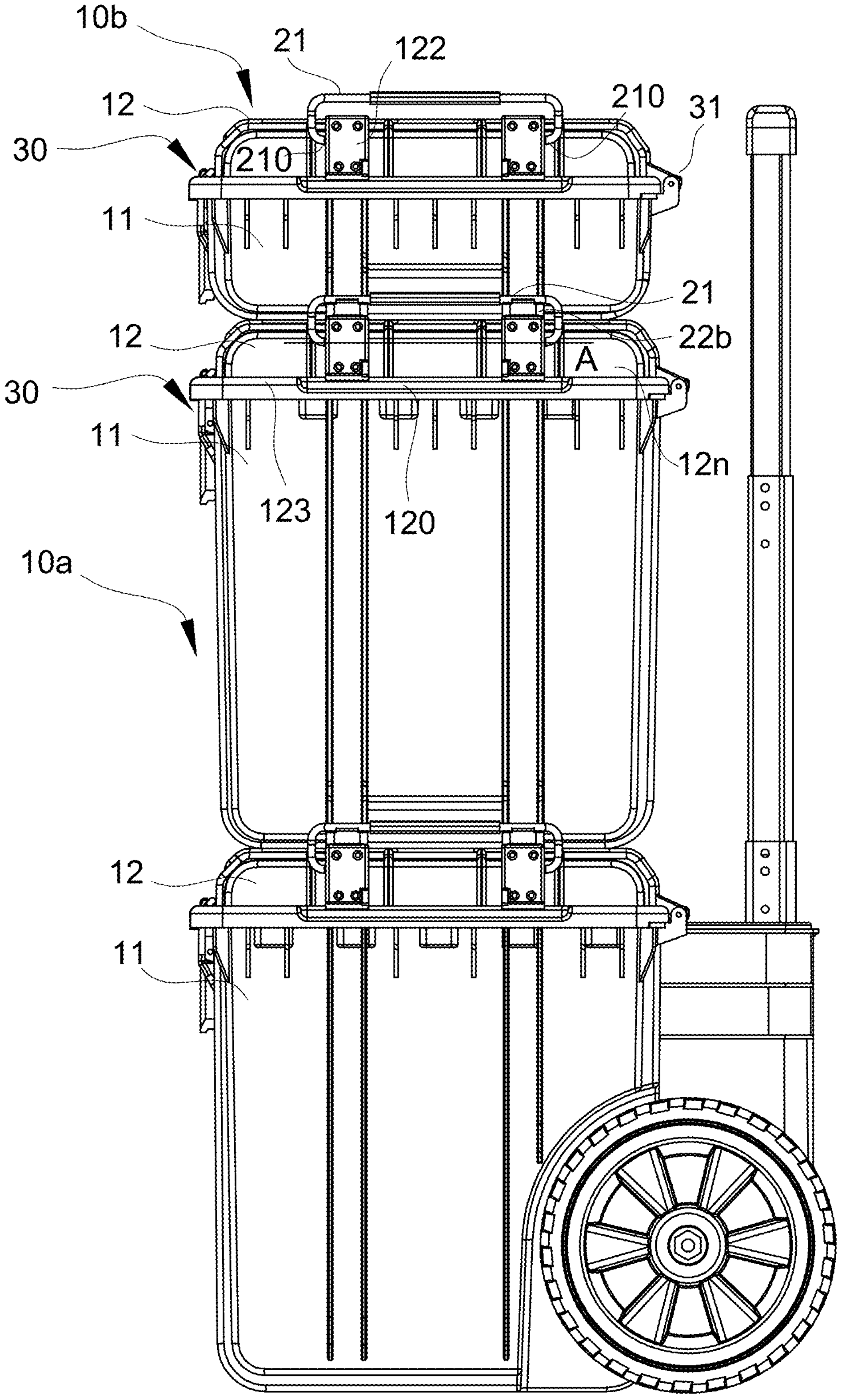
FIG. 3 is a right view of the FIG. 1.

The lid 12 of each case 10*a*, 10*b* may be detachably connected onto the case body 11, or articulated onto the case body 11 on one side of the lid 12 through a hinge mechanism 31. In this embodiment, as shown in FIG. 3, a rear side of the lid 12 is articulated to a rear side of the case body 11 through the hinge mechanism 31, so that the lid 12 can rotate relative to the case body 11 and then can be opened or closed. To reliably cover the lid 12 on the case body 11, a front side of the case body 11 and a front side of the lid 12 are locked through a corresponding lock catch 30.

The two stacked cases 10*a*, 10*b* can be locked together through the lock catch mechanism 20. The detail structure of the lock catch mechanism 20 disposed on the cases 10*a*, 10*b* will be described as below through the exploded view of the lock catch mechanism 20*c* in FIG. 4 and FIG. 3, FIG. 5.

The lock catch mechanism 20 comprises a lock catch member 21, two elastic members and a slider 24.

As shown in FIG. 3, the lock catch member 21 is capable of rotating relative to the cases 10*a*, 10*b* around a horizontally extending rotating shaft A, and is capable of rotatably connected to the sidewall 12*n* of the lid 12 of the cases 10*a*, 10*b*.

In a preferable solution, the lock catch member 21 is U-shaped, and comprises two opposite vertical bar portions 212 each having a free end and a cross bar portion 211 having two ends, each end of the cross bar portion 211 is connected to the free end of one of the two vertical bar portions 212. The free end of each vertical bar portion 212 of the lock catch member 21 is bent to form a pin portion 213, and the two pin portions 213 extending toward each other (or away from each other) are located in the same axis, the lock catch member 21 is rotatably hinged to the sidewall 12*n* of the lid 12 of the cases 10*a*, 10*b* through the two pin portions 213. The two pin portions 213 of the lock catch member 21 is regarded as a pivot shaft 210 of the lock catch member 21 in this embodiment, and the rotating shaft A in FIG. 3 is the pin portions 213 of the lock catch member 21.

Figure 5:
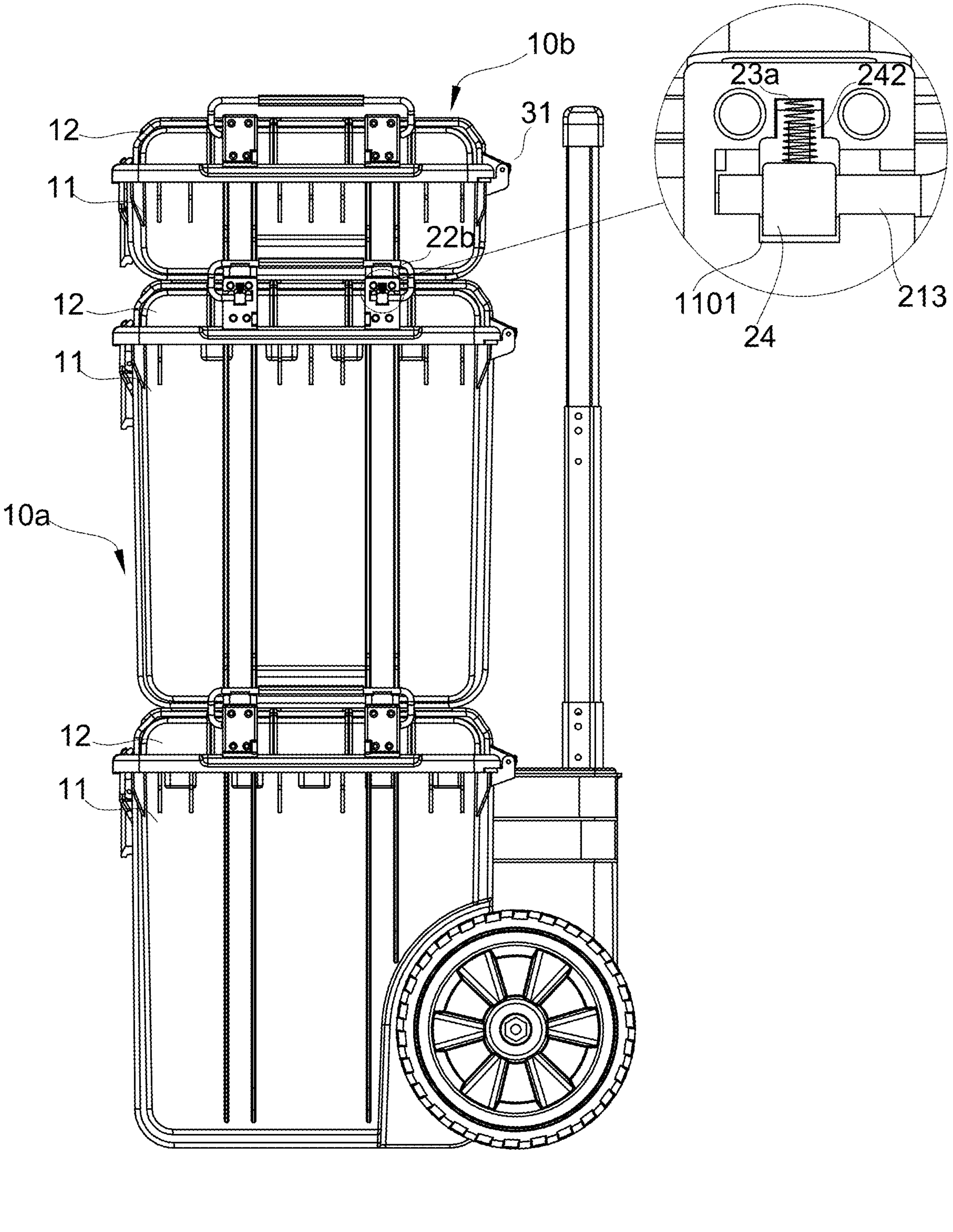
FIG. 5 is a view of FIG. 3 with an enlarged view of the lock catch member when a cover plate of a pin portion of the lock catch member is omitted.

As shown in FIG. 5, the lid 12 has two bumps 110 protruding outward from the sidewall 12*n* of the lid 12, each bump 110 is defined as a connecting seat 110 for being connected to the pivot shaft 210 of the lock catch member 21. Each bump 110 has a vertically extending opening 1101 facing outside at a surface of the bump 110, and a cover plate 122 capable of detachably covering the opening 1101 is connected to the corresponding bump 110 through screws. A vertically extending limiting groove 111 is defined by the opening 1101 of each bump 110 and the corresponding cover plate 122. Each bump 110 of the lid 12 further comprises an opening 112 laterally communicating with the corresponding limiting groove 111 for the pivot shaft 210 of the lock catch member 21 to pass through to connect to the slider 24 disposed inside the limiting groove 111.

The slider 24 slidable along the corresponding limiting groove 111 is constrained in each limiting groove 111. Each slider 24 has a horizontally extending positioning hole 241 facing the opening 112 on the bump 110. Each pin portion 213 of the lock catch member 21 passes through the opening 112 on the corresponding bump 110 to be held in the positioning hole 241 of the corresponding slider 24. When each pin portion 213 of the lock catch member 21 is appropriately assembled in the positioning hole 241 of the corresponding slider 24, the lock catch member 21 can freely rotate relative to the slider 24 around its pin portions 213.

Figure 4:
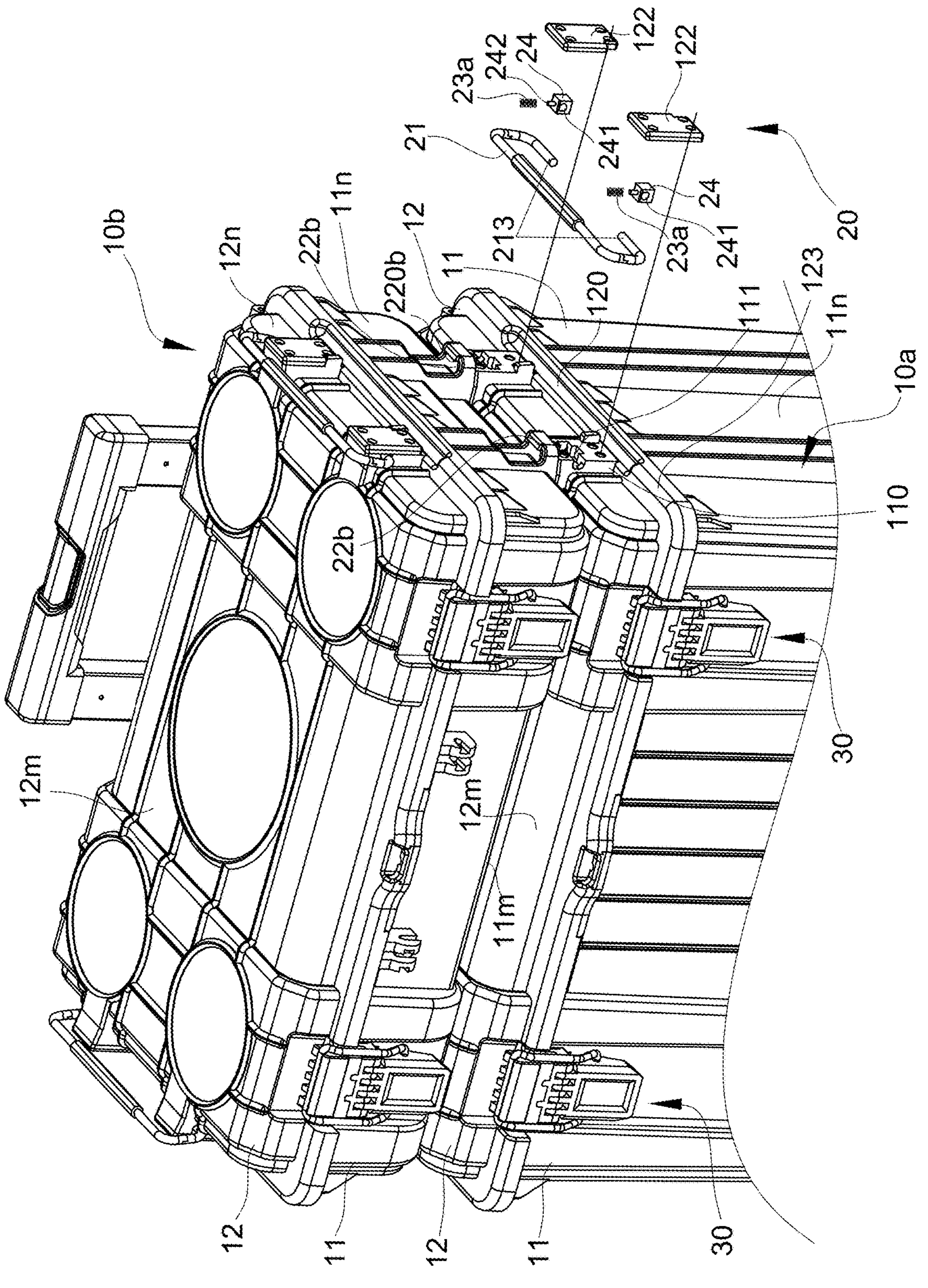
FIG. 4 is an exploded view of the lock catch mechanism according to the embodiment of the present invention.

As shown in FIG. 4 and FIG. 5, in this embodiment, the slider 24 has a positioning post 242 protruding from a top of the slider 24, each elastic member disposed inside the limiting groove 111 of the bump 110 is a compression spring 23*a* having two ends, one end of each compression spring 23*a* is sleeved on the positioning post 242 and the other end resists against an inner wall of the limiting groove 111.

Figure 8:
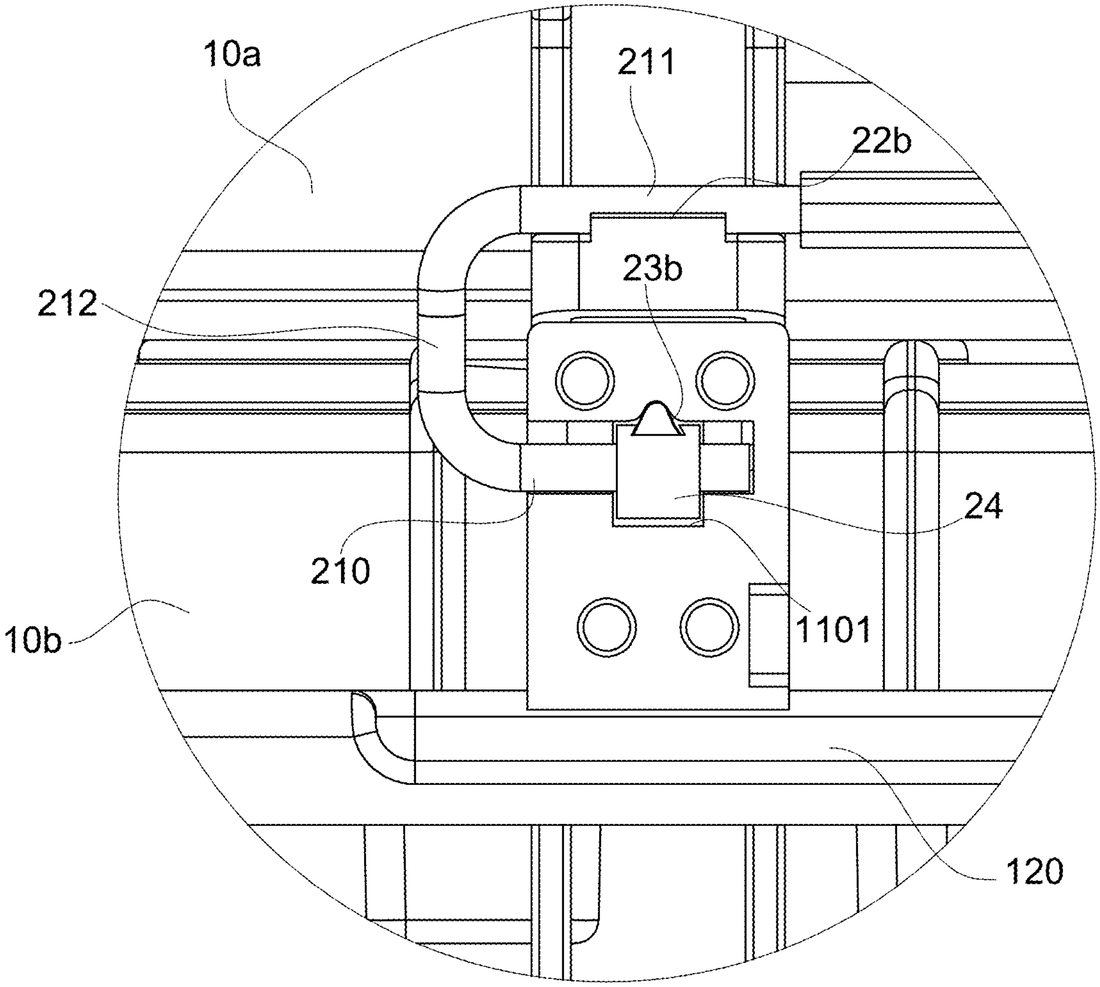
FIG. 8 is another enlarged view of the lock catch member when the elastic member in FIG. 5 is replaced with a spring leaf.
Figure 9:
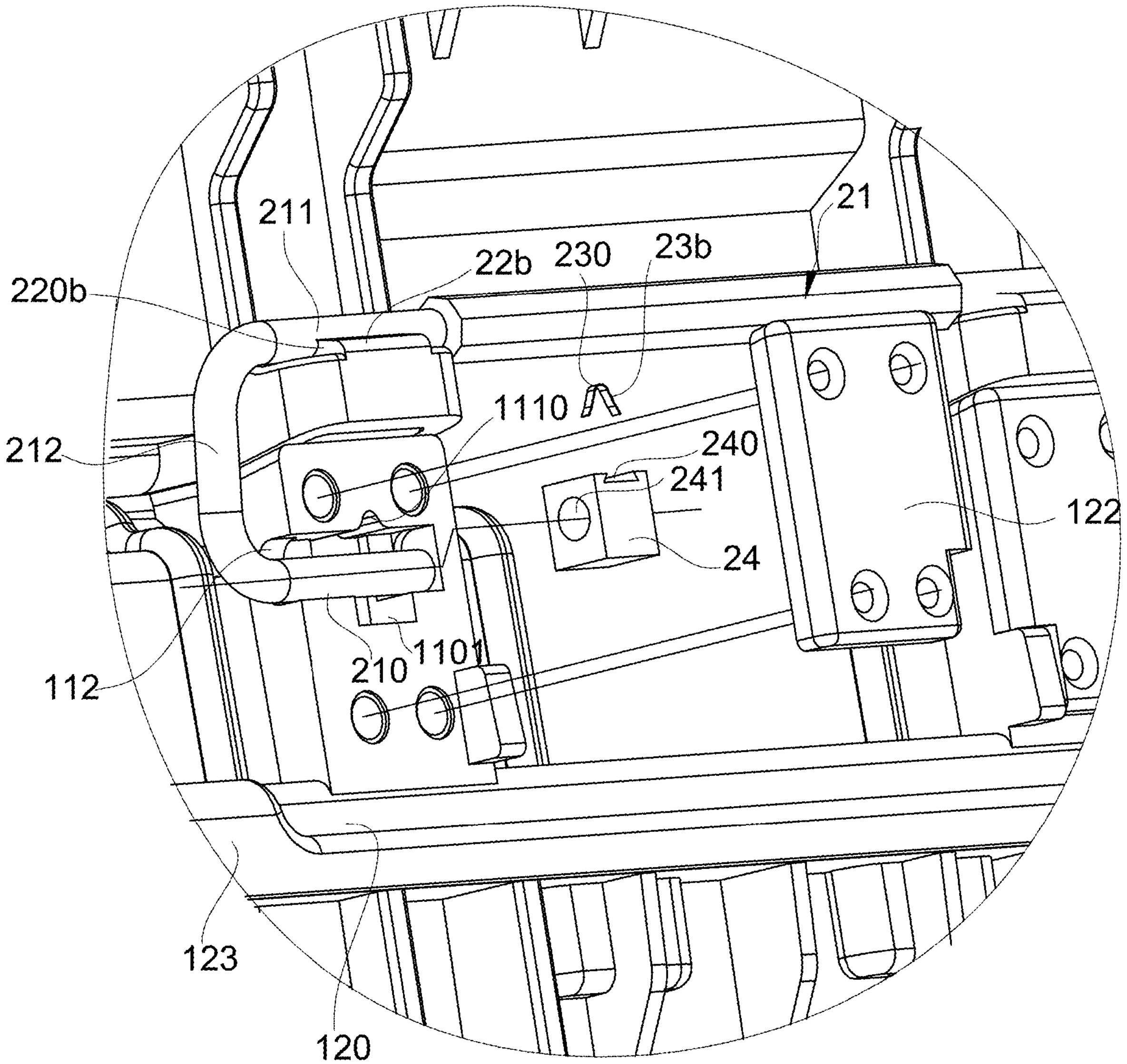
FIG. 9 is an exploded view of the FIG. 8.

In another embodiment, as shown in FIG. 8 and FIG. 9, each elastic member is a spring leaf 23*b*. The slider 24 has a positioning slot 240 on a top of the slider 24. Each spring leaf 23*b* is an arched strip with an arch-up portion 230 in a middle of the spring leaf 23*b*. Two ends of each spring leaf 23*b* are limited in the positioning slot 240 of the corresponding slider 24. The limiting groove 111 has a limiting recess 1110 on an inner sidewall of the limiting groove 111 corresponding to the arch-up portion 230 of each spring leaf 23*b* for receiving the arch-up portion 230, so that the spring leaf 23*b* is positioned, avoiding its shaking, as shown in FIG. 8 and FIG. 9.

During the assembly of the lock catch mechanism 20, first, the slider 24 and the elastic member may be put in the opening 1101 of the bump 110, then the pivot shaft 210 of the lock catch member 21 passes through the opening 112 to be inserted into the positioning hole 241 of the slider 24, and finally the cover plate 122 is connected to the bump 110 through screws. The slider 24 and the elastic member will not get off from the limiting slide groove 111 due to an arrangement of the cover plate 122.

As shown in FIG. 4, there are two connecting seats (bumps 110) on the sidewall 12*n* of the lid 12 of the cases 10*a*, 10*b*. The two connecting seats are horizontally arranged one by one on the sidewall 12*n* of the lid 12. The two pin portions 213 of the lock catch member 21 are connected, in a rotary way, to the two connecting seats, respectively.

The lock catch member 21, which is U-shaped, can be used as a handle, convenient for the user to hold it to transport cases.

Since the rotation of the lock catch member 21 relative to the slider 24 is not interfered with the up-down movement of the slider 24 in the limiting groove 111, the locking and unlocking flexibility of the lock catch member 21 is ensured, without getting stuck.

Next, the working process of the lock catch mechanism 20 will be described by taking, as an example, the combined container with two stacked cases 10*a*, 10*b* which are locked by the lock catch mechanism 20.

The two stacked cases 10*a*, 10*b* are defined as an upper case 10*b* and a lower case 10*a*. The upper case 10*b* has two second engagement portions 22*b* protruding outward from the sidewall 11*n* of the case body 11 at the bottom of the sidewall 11*n* of the case body 11 of the upper case 10*b* to be engaged with the cross bar portion 211 of the lock catch member 21. The second engagement portions 22*b* are second protruded portions which is protruded outward relative to the sidewall 11*n* of the case body 11 of the case 10*b*. Each second engagement portion 22*b* has a stopper 220*b* protruded upward from a top of the second engagement portion 22*b*, so that each second engagement portion 22*b* looks like a hook as a whole, as shown in FIG. 7.

Figure 1:
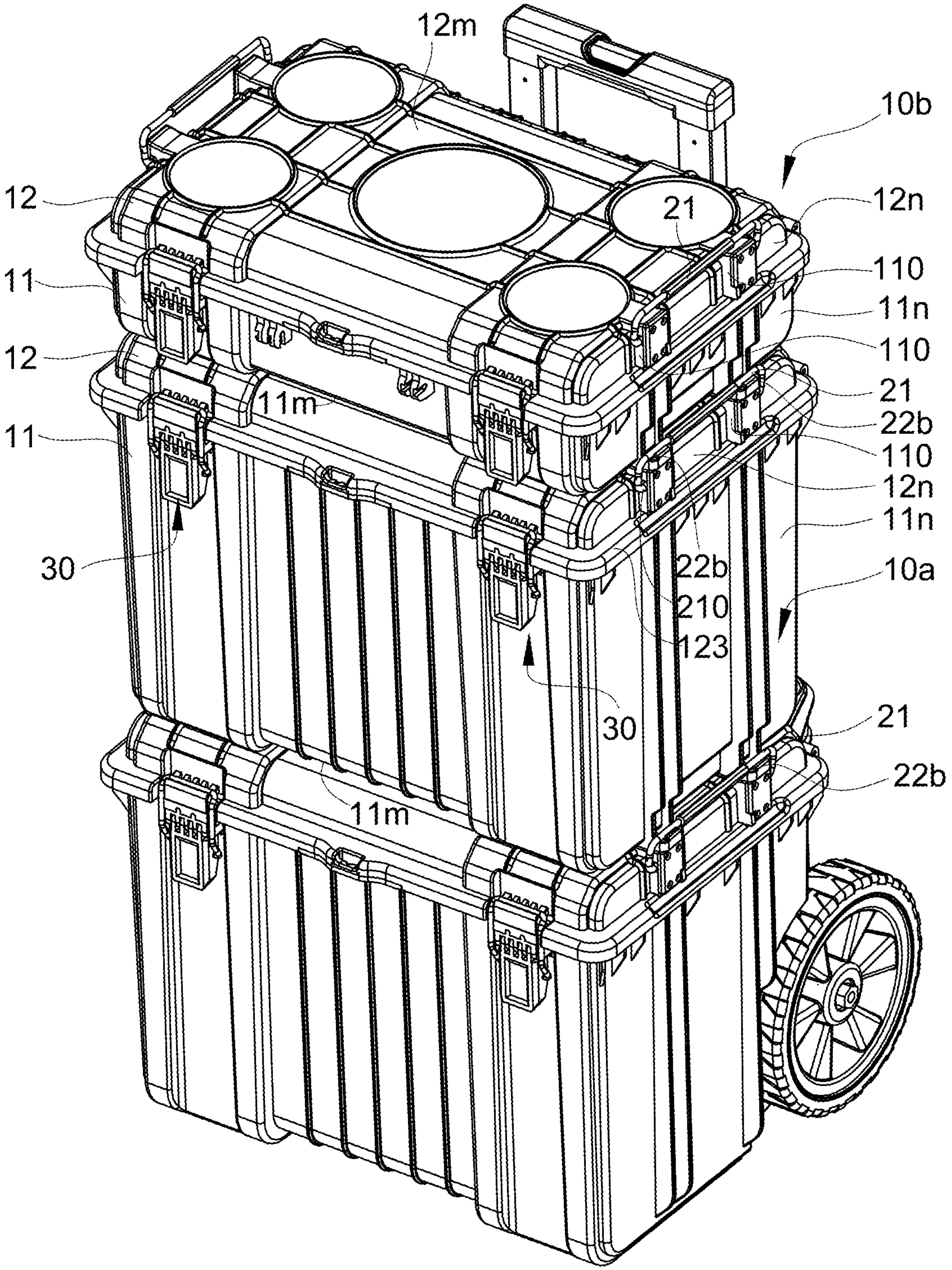
FIG. 1 is a perspective view of a combined container with three cases stacked up and down according to an embodiment of the present invention (when a lock catch member of a lock catch mechanism is in a second locked position)
Figure 2:
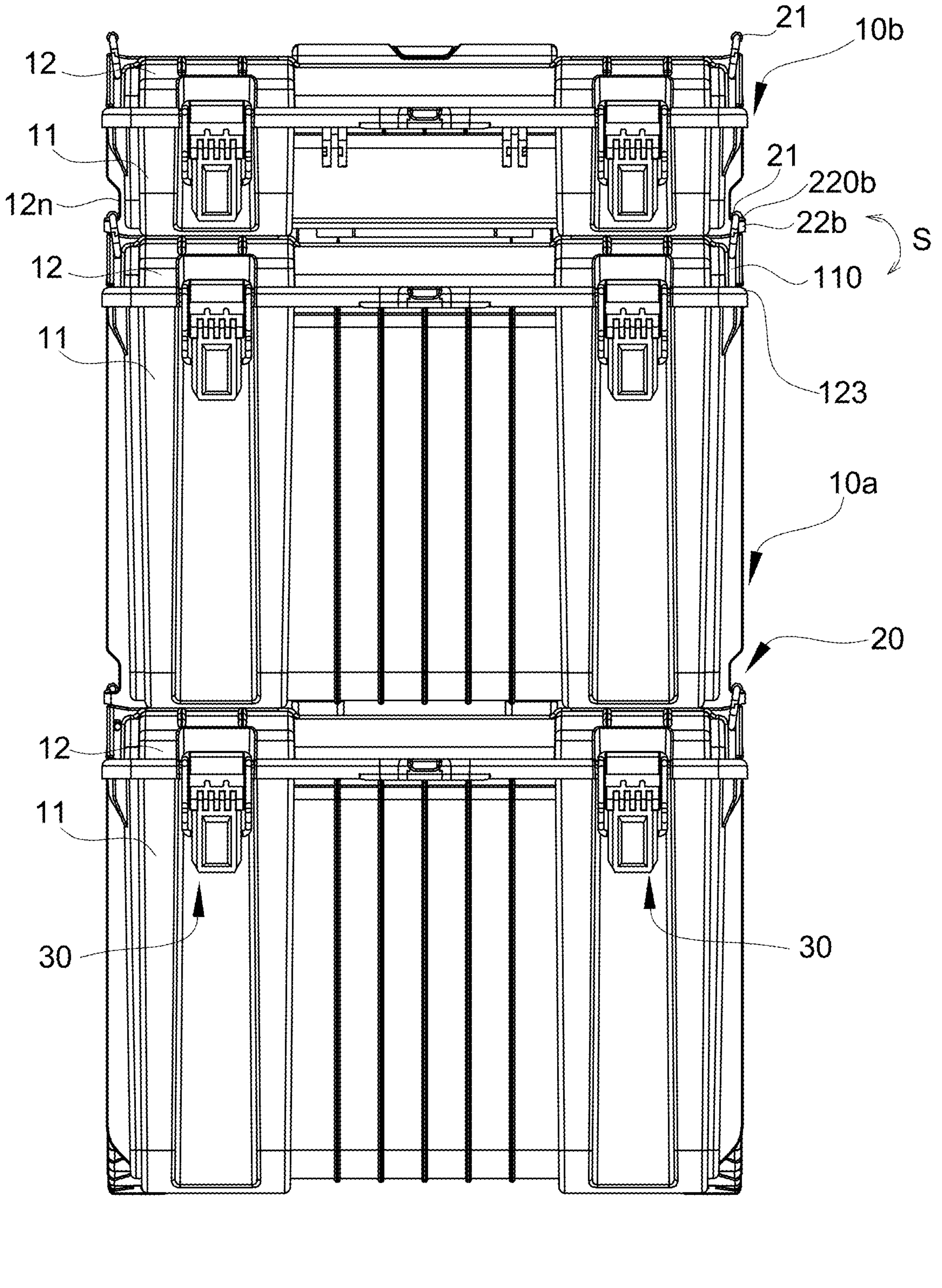
FIG. 2 is a front view of the FIG. 1.
Figure 6:
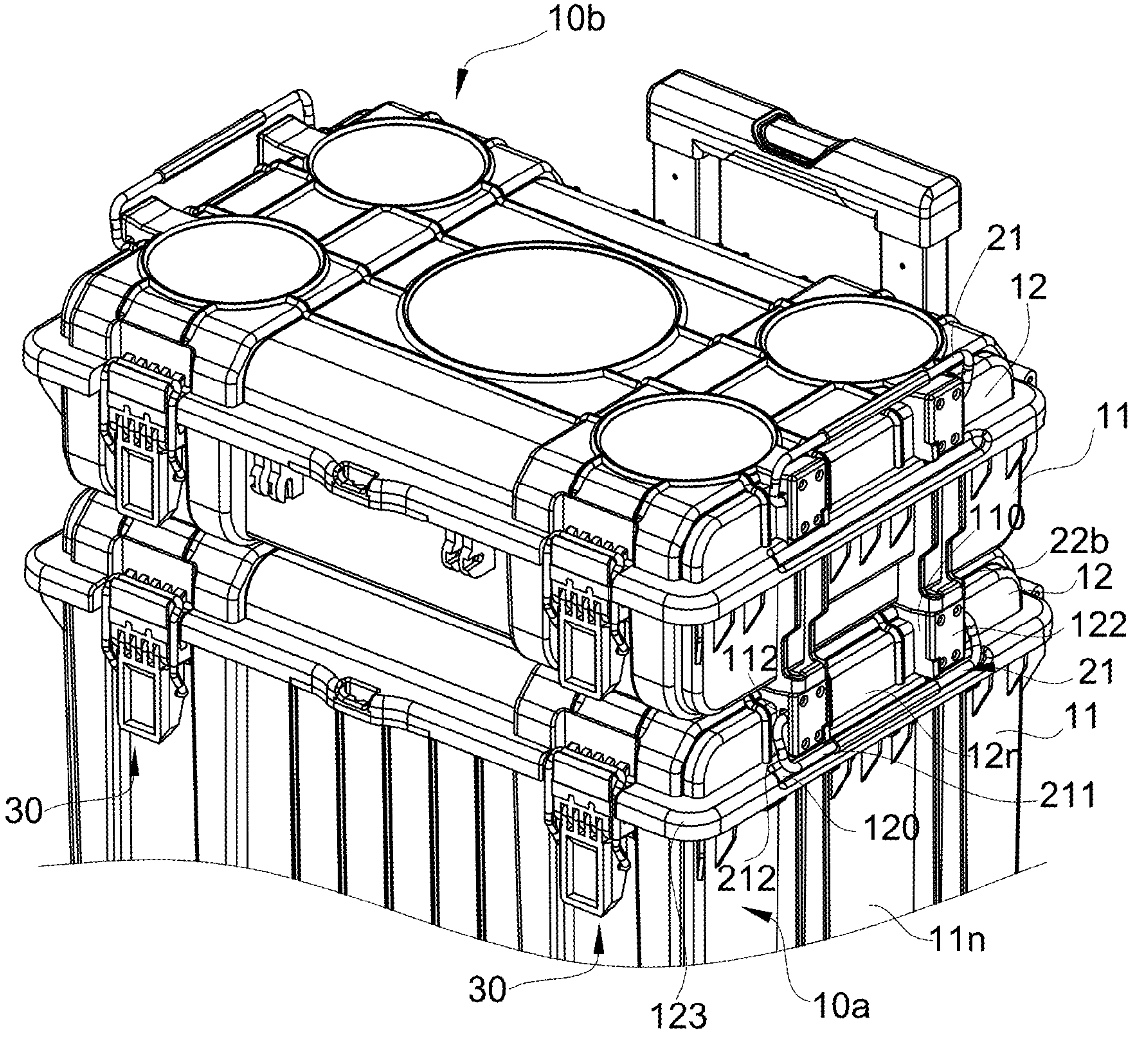
FIG. 6 is a perspective view of a part of FIG. 1 when the lock catch member is in a first unlocked position.

Two second engagement portions 22*b* are disposed on the sidewall 11*n* of the case body 11 of the upper case 10*b*. The two second lock portions 22*b* are substantially the same in structure, and are horizontally disposed alternatively on the sidewall 11*n* of the case body 11 of the case 10*b*. When the two cases 10*a*, 10*b* are stacked up and down, a vertical position of the two second engagement portions 22*b* disposed on the sidewall 11*n* of the case body 11 of the upper case 10*b* corresponds to the corresponding lock catch mechanism 21 disposed on the sidewall 12*n* of the lid 12 of the upper case 10*a*. The lock catch member 21 is capable of at least rotating between a first unlocked position and a second locked position in a direction indicated by a double-headed arrow s shown in FIG. 2. In the first unlocked position, the lock catch member 21 on the sidewall 12*n* of the lid 12 of the lower case 10*a* is disengaged from the corresponding second engagement portion 22*b* on the sidewall 11*n* of the case body 11 of the upper case 10*b*, and as shown in FIG. 6, and resists against the sidewall 12*n* of the lid 12 of the lower case 10*a*. In the second locked position, the lock catch member 21 on the sidewall 12*n* of the lid 12 of the lower case 10*a* engages the second engagement portion 22*b* on the sidewall 11*n* of the case body 11 of the upper case 10*b*, as shown in FIG. 2.

When it is needed to lock the two stacked cases 10*a*, 10*b* together, the lock catch member 21 on the sidewall 12*n* of the lid 12 of the lower case 10*a* rotates to the second locked position around the pivot shaft 210. In this case, the cross bar portion 211 of the lock catch member 21 is engaged with the two second engagement portions 22*b* on the sidewall 11*n* of the case body 11 of the upper case 10*b* to realize locking. When it is needed to unlock the two stacked cases 10*a*, 10*b*, the lock catch member 21 on the sidewall 12*n* of the lid 12 of the lower case 10*a* rotates downward around the pivot shaft 210. In this case, the lock catch member 21 is disengaged from the two second engagement portions 22*b* on the upper case 10*b*, and rotates to the first unlocked position as shown in FIG. 6.

Any two stacked cases may be regarded as the first case 10*a* (the lower case) and the second case 10*b* (the upper case), respectively. In this embodiment, each of the first case 10*a* and the second case 10*b* comprises the case body 11 having the opening on the top and the lid 12 covering the top opening of the case body 11. Both the lock catch member 21 and the second engagement portion 22*b* are disposed on each of the first case 10*a* and the second case 10*b*. For each case, the lock catch member 21 is disposed on the sidewall 12*n* of the lid 12 of the case, and the second engagement portion 22*b* is arranged at a position below the sidewall 11*n* of the case body 11 of the case. In this way, when any two cases are stacked up and down, they can be locked together through the lock catch member 21 on the sidewall 12*n* of the lid 12 of the lower case 10*a* and the second engagement portion 22*b* on the sidewall 11*n* of the case body 11 of the upper case 10*b*.

Since the lock catch member 21 is slidable along the sidewall 12*n* of the lid 12 of the case, that is, there is a certain margin for a vertical movement of the lock catch member 21, then when the lock catch member 21 is rotated, the user pulls the lock catch member 21 upward so that the lock catch member 21 can move a certain distance upward against an elastic restoring force of the elastic member. Therefore, the lock catch member 21 can be locked or unlocked by applying certain external force to the lock catch member 21 in the up-down direction during its rotation. By applying the external force in such a way, it is unnecessary for the user to laterally apply great force, which meets the operating habit of the user, and effectively reduces the abrasion to the case by the lock catch member 21 due to the friction. It avoids the failure of locking due to the deformation of the material of the case. Thus, the case is not required to have enough strength at the corresponding parts. It is thus possible to further reduce the material cost of the case. When it is necessary to release the lock catch member 21, under the elastic restoring force of the elastic member, the lock catch member 21 will resist against the second engagement portion 22*b*, so that the locking between the stacked cases is more stable and reliable.

By arranging the lock catch member 21 on the lid 12 of the case, the lid 12 of the lower one of two stacked cases in the locked position can still be opened, so that the user can put into or take out objects from the lower case, with no need to unlock and take down the upper case.

As shown in FIG. 6, a resting recess 120 is formed on a surface of the edge 123 of the sidewall 12*n* of the lid 12 of the case 10*a*, 10*b*. When the lock catch member 21 is in the unlocked position i.e., (in the natural placement position), the cross bar portion 211 of the lock catch member 21 is embedded in the resting recess 120, and the cross bar portion 211 of the lock catch member 21 is approximately flush to the surface of the edge 123 beyond a periphery of the resting recess 120 on the lid 12.

The resting recess 120 on the edge 123 of the lid 12 of the case 10*a*, 10*b* is a strip trench extending horizontally, a length of which is substantially the same as a length of the cross bar portion 211 of the lock catch member 21. When the lock catch member 21 of the lower case 10*a* is in the natural placement position as shown in FIG. 6 (that is, in the first unlocked position), the pin portions 213 of the lock catch member 21 and the cross bar portion 211 of the lock catch member 21 are dislocated in a vertical direction, that is, the lock catch member 21 inclines away from the case from top to bottom. This is more convenient for the user to pick the cross bar portion 211 of the lock catch member 21 from the resting recess 120 on the lid 12.

Since the cross bar portion 211 of the lock catch member 21 is embedded in the resting recess 120 on the edge 123 of the lid 12 of the case when the lock catch member 21 is in the first unlocked position, it is hard for the lock catch member 21 to be damaged by collision. On the other hand, since the cross bar portion 211 of the lock catch member 21 resists against the edge 123 which is protruded outward from the sidewall 12*n* of the lid 12, the pin portions 213 of the lock catch member 21 and the cross bar portion 211 of the lock catch member 21 are dislocated in the vertical direction, that is, the lock catch member 21 inclines away from the case from top to bottom when the lock catch member 21 is in the first unlocked position. This is more convenient for the user to pick the cross bar portion 211 of the lock catch member 21 from the resting recess 120 on the lid 12.

Figure 10:
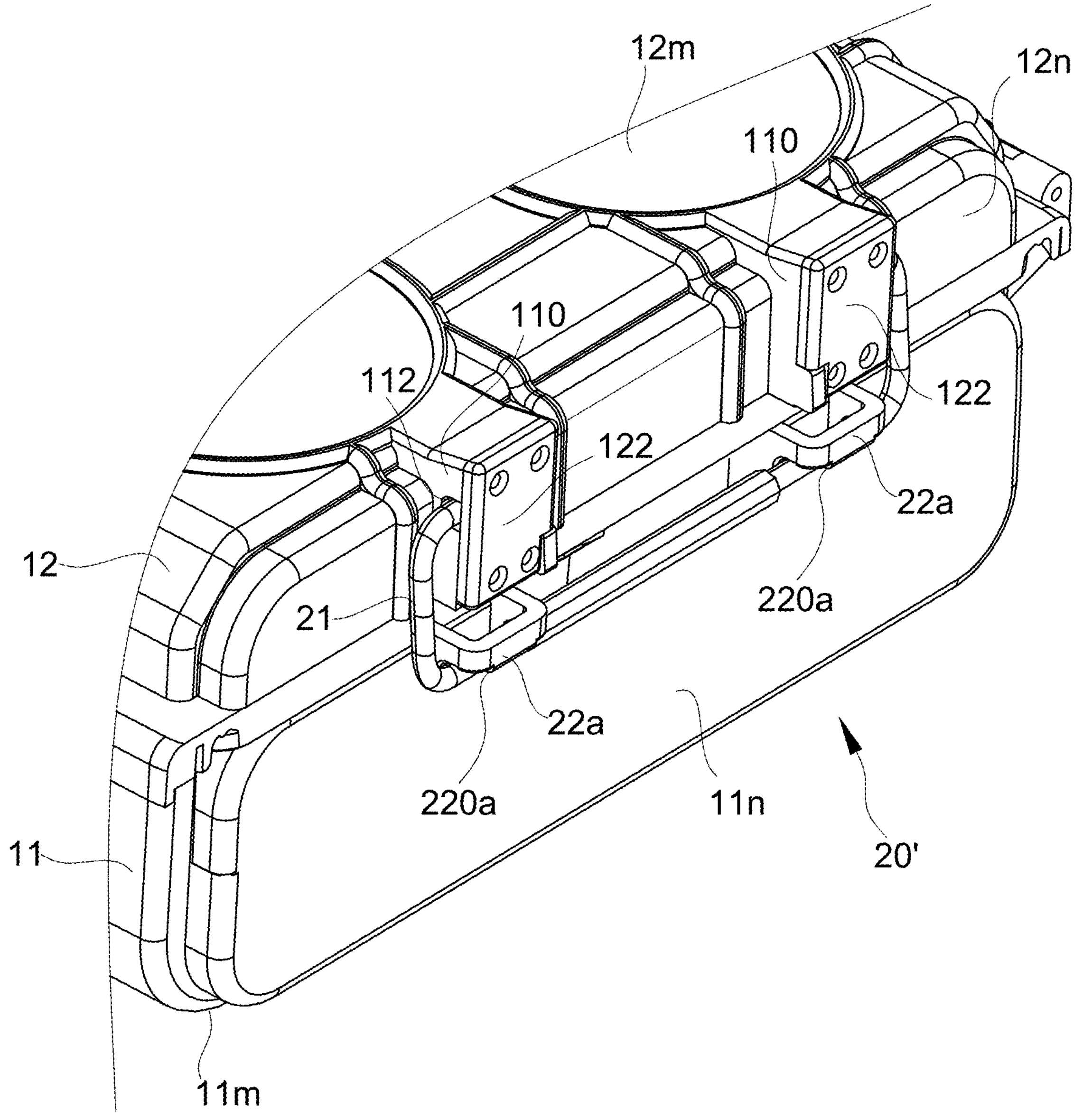
FIG. 10 is a perspective view of a lock catch mechanism on a case according to a second embodiment of the present invention showing a lid and a case body of a same case are locked with each other through the lock catch mechanism.
Figure 11:
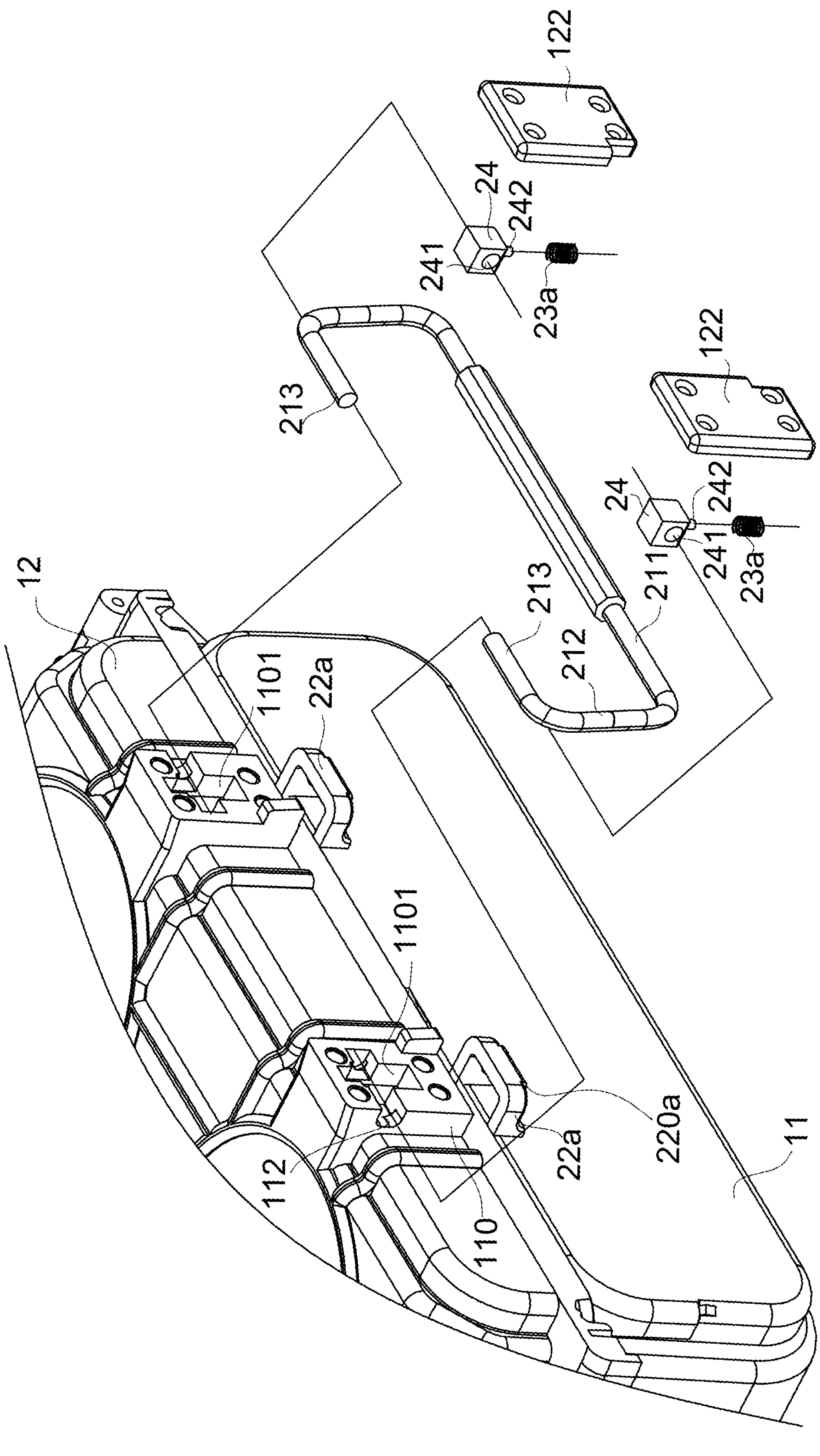
FIG. 11 is an exploded view of the FIG. 10.

FIG. 10 and FIG. 11 show a second embodiment of a case of the present invention. Different from the case in the above embodiment, the case in this embodiment comprises a case body 11 having an opening on the top and a lid 12 covering the top opening of the case body 11. The case body 11 and the lid 12 are locked together through a lock catch mechanism 20'.

Two first protruded portions are protruding outward from a sidewall 11*n* of the case body 11 and is defined as a first engagement portion 22*a*. Each first protruded portion has a stopper 220*a* protruding downward from a bottom of each first protruded portion, to prevent the lock catch member 21 from sliding off from the bottom of the first engagement portion 22*a* by accident. Each first protruded portion forms the first engagement portion 22*a* of the case body 11 of the case.

The lock catch member 21 of the lock catch mechanism 20' is disposed on the sidewall 12*n* of the lid 12, and a vertical position of each first engagement portion 22*a* on the sidewall 11*n* of the case body 11 corresponds to the corresponding lock catch member 21 on the lid 12. In this way, when the lock catch member 21 rotates downward to the locked position shown in FIG. 10, each lock catch member 21 on the sidewall 12*n* of the lid 12 engages with the corresponding first engagement portion 22*a* on the sidewall 11*n* of the case body 11, so that the lid 12 and the case body 11 of the case are locked together. When it is needed to unlock the case body 11 and the lid 12 of the case, the user can rotate the lock catch members 21 upward so that the lock catch members 21 are disengaged with the first engagement portion 22*a*.

Two first engagement portions 22*a* are formed on the sidewall 11*n* of the case body 11 of the case. The two first engagement portions 22*a* are substantially the same in structure, and are arranged in a horizontal direction. When the lock catch member 21 rotates downward to be locked, the cross bar portion 211 of the lock catch member 21 is locked with both the two first engagement portions 22*a*.

It may be understood that, in this embodiment of the case, each elastic member should be located below the corresponding pin portion 213 or slider 24 of the lock catch member 21 so that the lock catch member 21 can, under an external force, move downward against the elastic restoring force of the elastic member. The lock catch member 21 resets to a rest position when the external force withdraws.

It should be understood that the term "case" used in the present invention means any type of cases or working units that can be used as tool kits, sorting cases, luggage cases, cosmetic bags, containers, and transport cases. The term "case" further comprises units used together with the containers, for example, fixed mounts, workbenches, etc.

On the basis of the above embodiments, other embodiments may be obtained by replacement and improvement to the relevant technical features. For example, in an embodiment of a combined container comprising two stacked cases which are locked through a lock catch mechanism 20, a lock catch member 21 of the lock catch mechanism 20 is not limited to be disposed on the lid 12 of the case, it may be disposed in an upper region of a sidewall 11*n* of a case body 11 in a lower portion of the case, that is, the lock catch member 21 on the case body 11 of the lower case can be locked to second engagement portions 22*b* on the case body 11 of the upper case by rotating upward relative to the lower case. For another example, in an embodiment of a combined container comprising two stacked cases which are locked through a lock catch mechanism 20, the lock catch member 21 of the lock catch mechanism 20 may be disposed in a lower region of a sidewall 11*n* of the case body 11 of the upper case, and second engagement portions 22*b* may be correspondingly disposed on the sidewall of the lid 12 or sidewall 11*n* of the case body 11 of the lower case. The lock catch member 21 of the upper case can be locked to the second engagement portions 22*b* on the lower case by rotating downward relative to the upper case. In this case, an elastic member of the lock catch mechanism 20 resists against a slider 24, urging the lock catch member 21 to move upward. For still another example, in an embodiment where a case body 11 and a lid 12 both forming a case are locked through a lock catch mechanism 20, the lock catch member 21 of the lock catch mechanism 20 may be disposed on a sidewall 11*n* of the case body 11 of the case, and first engagement portions 22*a* are correspondingly disposed on the sidewall 12*n* of the lid 12 of the case. The lock catch member 21 on the sidewall 11*n* of the case body 11 of the case can be engaged with the first engagement portions 22*a* on the lid 12 of the case by rotating upward.

The invention claimed is:

1. A lock catch mechanism for a case, comprising:

a lock catch member (21) being rotatably connected to a sidewall of the case body (11) or the lid (12);

one or more elastic members (23*a*; 23*b*) disposed on the sidewall of the case body (11) or the lid (12);

wherein, the lock catch member (21) is U-shaped as a whole and has two free ends facing each other, the two free ends of the lock catch member (21) extend toward each other or away from each other to form pin portions (213) which are located in a same line, the two pin portions (213) of the lock catch member (21) are rotatably connected to the sidewall of the case body (11) or the lid (12), the number of the elastic members (23*a*; 23*b*) is two, each of which acts on the corresponding pin portion (213) of the lock catch member (21);

the lock catch member (21) is capable of rotating relative to the case around a horizontally extending rotating shaft (A), and is capable of moving upward and downward along the sidewall of the case body (11) or the lid (12), and the lock catch member (21) is used as a handle;

the lock catch member (21) moves upward or downward against an elastic restoring force of the one or more elastic members (23*a*; 23*b*) when acted upon by an external force and resets to a rest position when the external force withdraws.

2. The lock catch mechanism of claim 1, wherein the lock catch member (21) has a pivot shaft (210) pivoted to the sidewall of the case body (11) or the lid (12), and the one or more elastic members (23*a*; 23*b*) act on the pivot shaft (210) of the lock catch member (21).

3. The lock catch mechanism of claim 2, wherein the case body (11) or the lid (12) has one or more bumps (110) protruding outward from the sidewall of the case body (11) or the lid (12), each bump (110) is defined as a connecting seat (110) for being connected to the pivot shaft (210) of the lock catch member (21);

each connecting seat (110) has a vertically extending limiting groove (111), and a slider (24) slidable along the corresponding limiting groove (111) is constrained in each limiting groove (111);

each connecting seat (110) has an opening (112) laterally communicating with the corresponding limiting groove (111) for the pivot shaft (210) of the lock catch member (21) to pass through to connect to the slider (24), each elastic member (23*a*; 23*b*) is positioned inside the corresponding limiting groove (111) and resists against the corresponding slider (24).

4. The lock catch mechanism of claim 3, wherein each slider (24) has a positioning hole (241) for receiving the pivot shaft (210) of the lock catch member (21) and the pivot shaft (210) is capable of rotating inside the corresponding positioning hole (241).

5. The lock catch mechanism of claim 3, wherein the limiting groove (111) is an opening (1101) facing outside at a surface of the bump (110), and a cover plate (122) detachably covers the opening (1101).

6. The lock catch mechanism of claim 3, wherein the slider (24) has a positioning post (242) protruding from a top or a bottom of the slider (24), each elastic member (23*a*) is a compression spring having two ends, one end of each elastic member (23*a*) is sleeved on the positioning post (242) and the other end resists against an inner top wall or inner bottom wall of the limiting groove (111).

7. The lock catch mechanism of claim 3, wherein the slider (24) has a positioning slot (240) on a top or bottom of the slider (24), each elastic member is defined as a spring leaf (23*b*) which is capable of being inserted into the positioning slot (240) to resist against an inner top wall or inner bottom wall of the limiting groove (111).

8. The lock catch mechanism of claim 7, wherein each spring leaf (23*b*) is an arched strip with an arch-up portion (230) in a middle of each spring leaf (23*b*);

the limiting groove (111) has a limiting recess (1110) on the inner top wall or inner bottom wall of the limiting groove (111) at a position corresponding to the arch-up portion (230) of each spring leaf (23*b*) for receiving the arch-up portion (230);

two ends of each spring leaf (23*b*) are limited in the positioning slot (240) of the slider (24), and the arch-up portion (230) is limited in the limiting recess (1110) of the limiting groove (111).

9. A case having the lock catch mechanism of claim 1, comprising: the case body (11) having the opening on the top and the lid (12) covering the top opening of the case body (11);

wherein, one of the case body (11) and the lid (12) has the lock catch member (21), and the other one of the case body (11) and the lid (12) has one or more first engagement portions (22*a*) protruding outward from the sidewall of the case body (11) or the lid (12);

vertical positions of the one or more first engagement portions (22*a*) correspond to the lock catch member (21) to engage the lock catch member (21) with the first engagement portions (22*a*) so as to fasten the case body (11) and the lid (12) together.

10. A combined container having the lock catch mechanism of claim 1, comprising at least two stacked cases which are defined as an upper case and a lower case;

wherein, the upper case has one or more second engagement portions (22*b*) protruding outward from the sidewall of the case body (11) at a bottom of the sidewall of the case body (11) of the upper case, and the lower case has the lock catch member (21) at the sidewall of the lid (12) or at a top of the sidewall of the case body (11) of the lower case;

the lock catch member (21) is capable of at least rotating between a first unlocked position where the lock catch member (21) is disengaged from the corresponding second engagement portion (22*b*) and a second locked position where the lock catch member (21) is engaged with the second engagement portion (22*b*);

the vertical position of the lock catch member (21) of the lower case corresponds to the corresponding second engagement portion (22*b*) of the upper case to engage the lock catch member (21) with the corresponding second engagement portion (22*b*) of the upper case when rotating upward to the second locked position, so that the two cases are fastened together.

11. The combined container of claim 10, wherein the lock catch member (21) is connected to the sidewall of the lid (12) of the lower case so that the lid (12) of the lower case can be opened relative to the case body (11) of the lower case when the lock catch member (21) is in the second locked position.

12. The combined container of claim 10, wherein the lower case has a resting recess (120) formed on the sidewall of the lid (12) of the lower case for receiving the lock catch member (21);

when the lock catch member (21) moves to the first unlocked position, at least a part of the lock catch member (21) is embedded in the resting recess (120).

13. The combined container of claim 12, wherein the lock catch member (21) is U-shaped, and comprises two opposite vertical bar portions (212) each having a free end and a cross bar portion (211) having two ends, each end of the cross bar portion (211) is connected to the free end of one of the two vertical bar portions (212);

the free end of each vertical bar portion (212) of the lock catch member (21) is bent to form a pin portion (213), and the two pin portions (213) extending toward each other or away from each other are located in the same axis, the lock catch member (21) is rotatably connected to the sidewall of the lid (12) of the case through the two pin portions (213);

the lid (12) has a convex skirt-like edge (123) protruding from a periphery of the sidewall of the lid (12) at a position below the pin portions (213), the resting recess (120) is formed on a surface of the edge (123);

when the lock catch member (21) moves to the first unlocked position, the cross bar portion (211) of the lock catch member (21) is embedded in the resting recess (120) and is approximately flush to the peripheral surface of the edge (123).

* * * * *